US008732299B2

(12) United States Patent
Lai et al.

(10) Patent No.: US 8,732,299 B2
(45) Date of Patent: May 20, 2014

(54) SCALABILITY BREAKPOINT CALCULATOR FOR A SOFTWARE PRODUCT

(75) Inventors: Ray Y. Lai, Palo Alto, CA (US); Anjaneya Vara Vankayala Venkata, Sunnyvale, CA (US); Hari Ravi, Bangalore, IN (US)

(73) Assignee: Intuit Inc., Mountain View, CA (US)

( * ) Notice: Subject to any disclaimer, the term of this patent is extended or adjusted under 35 U.S.C. 154(b) by 358 days.

(21) Appl. No.: 12/861,709

(22) Filed: Aug. 23, 2010

(65) Prior Publication Data

US 2012/0047250 A1 Feb. 23, 2012

(51) Int. Cl.
*G06F 15/173* (2006.01)
(52) U.S. Cl.
USPC .......................................... 709/224; 709/226
(58) Field of Classification Search
None
See application file for complete search history.

(56) References Cited

U.S. PATENT DOCUMENTS

| | | | | |
|---|---|---|---|---|
| 6,029,257 | A * | 2/2000 | Palmer | 714/40 |
| 6,086,618 | A * | 7/2000 | Al-Hilali et al. | 703/2 |
| 6,782,421 | B1 * | 8/2004 | Soles et al. | 709/223 |
| 6,801,940 | B1 * | 10/2004 | Moran et al. | 709/224 |
| 7,035,919 | B1 * | 4/2006 | Lee et al. | 709/223 |
| 8,170,859 | B1 * | 5/2012 | Christensson et al. | 703/22 |
| 2003/0158930 | A1 | 8/2003 | McBride | |
| 2003/0172198 | A1 * | 9/2003 | Tiwary et al. | 710/1 |
| 2006/0085368 | A1 * | 4/2006 | Moilanen et al. | 706/45 |
| 2007/0136024 | A1 * | 6/2007 | Moser et al. | 702/119 |
| 2007/0180094 | A1 * | 8/2007 | Roth | 709/223 |
| 2007/0288891 | A1 * | 12/2007 | Aakolk et al. | 717/114 |
| 2008/0141240 | A1 * | 6/2008 | Uthe | 717/174 |
| 2009/0204975 | A1 * | 8/2009 | Hagiu et al. | 719/314 |
| 2010/0333072 | A1 * | 12/2010 | Dulip et al. | 717/128 |
| 2011/0145498 | A1 * | 6/2011 | Taillefer et al. | 711/118 |

* cited by examiner

*Primary Examiner* — Dhairya A Patel
(74) *Attorney, Agent, or Firm* — Park, Vaughan, Fleming & Dowler LLP; Steven E. Stupp

(57) ABSTRACT

During a technique for estimating a scalability breakpoint of a software product, performance load tests of the software product are performed with different numbers of simulated concurrent users. For a given number of simulated concurrent users, a performance load test may include an associated set of transactions that are executed by the software product. Furthermore, during the performance load tests performance metrics for the transactions in the associated sets of transactions are measured. Then estimated total performance metrics for the transactions in the associated sets of transactions for the different numbers of simulated concurrent users are determined based on the measured performance metrics and the associated sets of transactions. Next, using the determined estimated total performance metrics, the estimated scalability breakpoint is calculated.

21 Claims, 5 Drawing Sheets

SCALABILITY BREAKPOINT CALCULATOR FOR A SOFTWARE PRODUCT

BACKGROUND

The present disclosure generally relates to software products. More specifically, the present disclosure relates to techniques for determining a scalability breakpoint for an online implementation of a software product.

For a given implementation of an online software product with an associated hardware capacity, determining the scalability breakpoint, i.e., the optimal number of concurrent users of the software product, is an important product-release criterion. Using the scalability breakpoint, development teams can provide an improved customer experience and service with vertical and/or horizontal scalability. Alternatively, if the scalability breakpoint is not determined, development teams are usually forced to respond tactically to performance outage incidents in order to restore service, but are often unable to track down the root cause of the incidents because of time and resource constraints. This can result in sub-optimal computer-system utilization, and an unsatisfactory customer experience.

Capacity management simulation tools can be used to determine the scalability breakpoint for an online implementation of a software product. However, existing capacity management simulation tools tend to use very detailed queuing models to simulate the capacity of a computer system. These models are typically calibrated for a specific computer system or environment. Moreover, this calibration often involves collecting a large number of system statistics (such as an inter-arrival time distribution and a service-time distribution) before the scalability breakpoint can be determined, which can involve weeks of data preparation and iterative measurements. Such an extensive calibration procedure is often prohibitively expensive and time-consuming, which can prevent efficient development and may be an obstacle to aggressive product release schedules.

SUMMARY

The disclosed embodiments relate to a computer system that estimates a scalability breakpoint of a software product. During operation, the computer system executes performance load tests for different numbers of simulated concurrent users of the software product. Note that a performance load test for a given number of simulated concurrent users includes an associated set of transactions that are executed by the software product, and that a given transaction has an associated occurrence percentage during the performance load test. Then, during the performance load tests, the computer system measures performance metrics for the transactions in the associated sets of transactions. Furthermore, the computer system determines estimated total performance metrics for the transactions in the associated sets of transactions for the different numbers of simulated concurrent users based on the measured performance metrics and the associated sets of transactions. Next, the computer system calculates the estimated scalability breakpoint from the determined estimated total performance metrics.

In some embodiments, the performance metrics include an average response time and a throughput for each of the transactions in the associated sets of transactions for the different numbers of simulated concurrent users. Furthermore, the estimated total performance metrics may include an estimated total average response time and an estimated total throughput for the different numbers of simulated concurrent users.

Note that calculating the estimated scalability breakpoint may involve computing a number of simulated concurrent users at a scalability criterion, and the scalability criterion may include a minimum spacing between the estimated total average response time as a function of the number of simulated concurrent users and the estimated total throughput as a function of the number of simulated concurrent users. For example, the scalability criterion may include an intersection of the estimated total average response time as a function of the number of simulated concurrent users and the estimated total throughput as a function of the number of simulated concurrent users.

Additionally, determining the estimated total performance metrics may involve determining weights for the measured performance metrics for the transactions in the associated sets of transactions for the different numbers of simulated concurrent users. For example, for the given number of simulated concurrent users, determining the weights may involve a regression analysis using the measured performance metrics and the associated set of transactions for the given number of simulated concurrent users. In some embodiments, the computer system verifies the estimated scalability breakpoint based on differences between the measured performance metrics for the associated set of transactions for the given number of simulated concurrent users and corresponding estimated performance metrics. Note that, for the given number of simulated concurrent users, determining the estimated total performance metrics may involve calculating a weighted average of the measured performance metrics using the determined weights.

The software product may include a software application and an associated client-server hardware implementation. For example, the client-server hardware implementation may include at least: a web server, a load balancer and an application server.

Another embodiment provides a method that includes at least some of the operations performed by the computer system.

Another embodiment provides a computer-program product for use with the computer system. This computer-program product includes instructions for at least some of the operations performed by the computer system.

Figure 1:
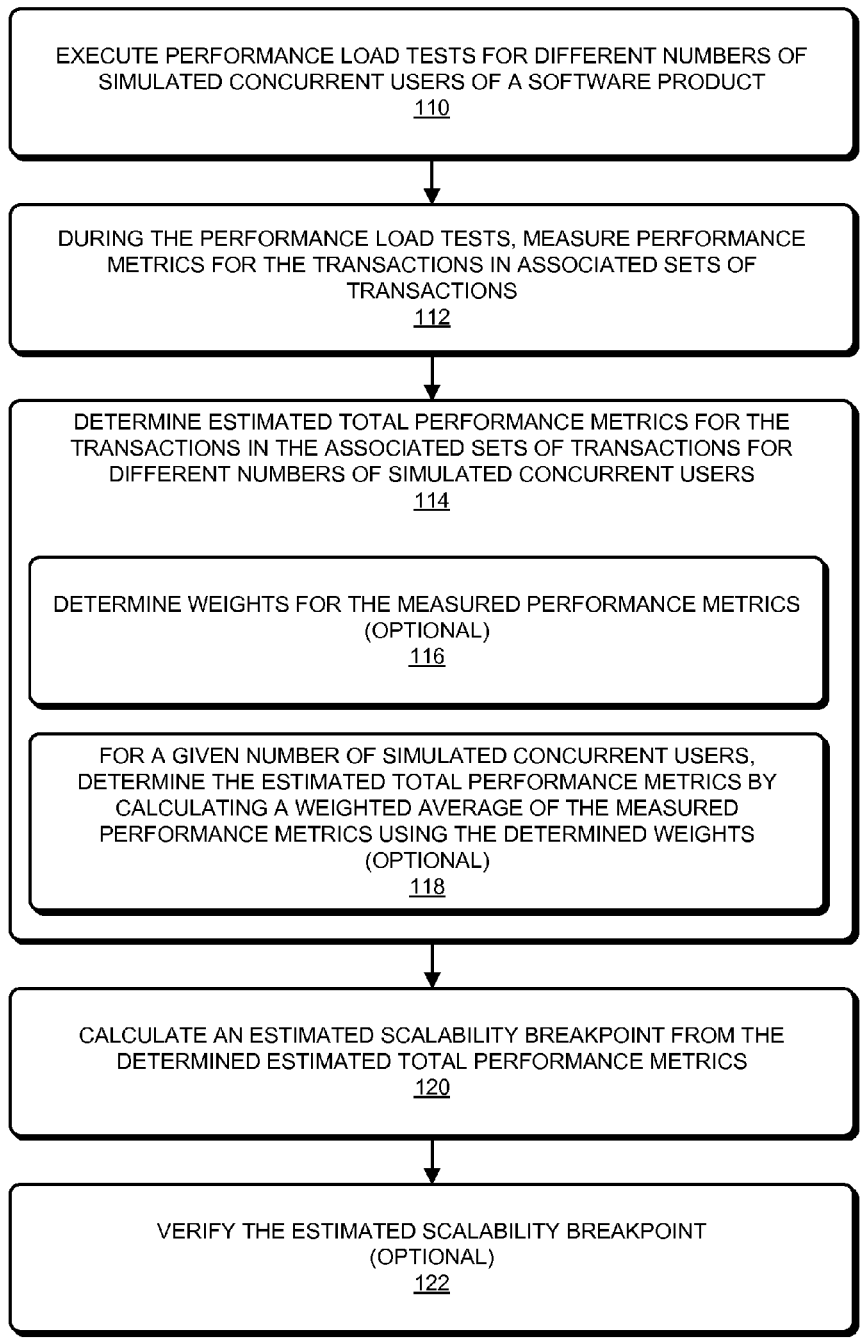
FIG. 1 is a flow chart illustrating a method for estimating a scalability breakpoint of a software product.

Table 1 provides an example of a set of transactions and associated occurrence percentages during performance load tests for different numbers of simulated concurrent users of the software product in accordance with an embodiment of the present disclosure.

Table 2 provides an example of the measured average response time, the measured throughput and the determined weight for each of the transactions in a set of transactions for a given number of simulated concurrent users of the software product in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for estimating a scalability breakpoint of a software product, and a computer-program product (e.g., software) for use with the computer system are described. During this estimation technique, performance load tests of the software product are performed with different numbers of simulated concurrent users. For a given number of simulated concurrent users, a performance load test may include an associated set of transactions (with associated occurrence percentages) that are executed by the software product. During the performance load tests, performance metrics (such as an average response time and a throughput) for the transactions in the associated sets of transactions are measured. Then, estimated total performance metrics (such as an estimated total average response time and an estimated total throughput) for the transactions in the associated sets of transactions for the different numbers of simulated concurrent users are determined based on the measured performance metrics and the associated sets of transactions. Using the determined estimated total performance metrics, the estimated scalability breakpoint is calculated, for example, based on a minimum spacing between the estimated total average response time as a function of the number of simulated concurrent users and the estimated total throughput as a function of the number of simulated concurrent users.

The estimation technique may reduce the time and cost needed to estimate the scalability breakpoint of the software product. For example, the calculation time may be reduced to a few hours (as opposed to weeks). In addition, the resulting estimated scalability breakpoint may be reasonably accurate, thereby representing an acceptable tradeoff among time, cost and accuracy. Determining such a coarse-grained scalability breakpoint estimate for online systems prior to each software product release or iteration may help quantify any technology risks, and may provide useful information to diagnose potential scalability issues. Consequently, the estimates may improve the quality and reliability of the software product when it is launched. Thus, the estimation technique may improve the satisfaction (and retention) of users of the software product, as well as the profitability and market share of the provider of the estimation technique.

In the discussion that follows, the user may include one of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

We now describe embodiments of the estimation technique. FIG. 1 presents a flow chart illustrating a method 100 for estimating a scalability breakpoint of a software product, which may be performed by a computer system (such as computer system 400 in FIG. 4). During operation, the computer system executes performance load tests for different numbers of simulated concurrent users of the software product (operation 110). Note that a performance load test for a given number of simulated concurrent users includes an associated set of transactions (and, more generally, operations, groups of operations, commands or software modules) that are executed by the software product (such as the top-N transactions for the software product), and that a given transaction has an associated occurrence percentage during the performance load test. (Thus, the probabilities of occurrence of the transactions in the set of transactions may not be the same, which may be more realistic.)

Then, during the performance load tests, the computer system measures performance metrics for the transactions in the associated sets of transactions (operation 112). For example, the performance metrics may include an average response time and a throughput for each of the transactions in the associated sets of transactions for the different numbers of simulated concurrent users (such as different numbers of concurrent users per hour).

Furthermore, the computer system determines estimated total performance metrics for the transactions in the associated sets of transactions for the different numbers of simulated concurrent users based on the measured performance metrics and the associated sets of transactions (operation 114). Note that the estimated total performance metrics may include an estimated total average response time and an estimated total throughput for the different numbers of simulated concurrent users.

Next, the computer system calculates the estimated scalability breakpoint from the determined estimated total performance metrics (operation 120). In particular, calculating the estimated scalability breakpoint may involve computing a number of simulated concurrent users at a scalability criterion, and the scalability criterion may include a minimum spacing between the estimated total average response time as a function of the number of simulated concurrent users and the estimated total throughput as a function of the number of simulated concurrent users. For example, the scalability criterion may include an intersection of the estimated total average response time as a function of the number of simulated concurrent users and the estimated total throughput as a function of the number of simulated concurrent users.

In some embodiments, the computer system determines the estimated total performance metrics by optionally determining weights for the measured performance metrics for the transactions in the associated sets of transactions for the different numbers of simulated concurrent users (operation 116). For example, for the given number of simulated concurrent users, determining the weights may involve a regression analysis using the measured performance metrics and the associated set of transactions for the given number of simulated concurrent users. Additionally, note that, for the given number of simulated concurrent users, the computer system may determine the estimated total performance metrics by optionally calculating a weighted average of the measured performance metrics using the determined weights (operation 118).

Furthermore, in some embodiments the computer system optionally verifies the estimated scalability breakpoint based on differences between the measured performance metrics for the associated set of transactions for the given number of simulated concurrent users and corresponding estimated performance metrics (operation 122).

This estimation technique may simplify the process of determining the scalability breakpoint for an online implementation of a software product. In some embodiments, the inputs to the estimation technique include the measured average response times and throughputs for different performance load tests executing in a computer system or environment with different numbers of concurrent users or requests (for example, a range of concurrent users with increments of ten users per hour). Furthermore, the output from the estimation technique may be the estimated scalability breakpoint, which may be based on a weighted average of the measured performance metrics. In particular, because production computer systems typically execute a number of transactions, weights may be used in the weighted averages to estimate the total average response time and the estimated total throughput for the top-N transactions (for example, by performing a weighted average of the average response times and throughputs). As described further below, in some embodiments the weight factors are derived from a step-wise performance load test. Note that the top-N transactions (which may be representative of the production computer system) may be extracted from a load test report associated with SilkPerformer® (from Micro Focus, Inc., of Rockville, Md.). However, in other embodiments a wide variety of performance automation scripting tools can be used.

By using the average response time and throughput to calculate the scalability breakpoint, the queuing model in the estimation technique may be significantly simplified relative to existing capacity management simulation tools. This may reduce the associated calibration time and effort.

In some embodiments, the estimation technique can be subdivided into: data-preparation operations, calibration operations, and scalability-breakpoint operations. In particular, during the data-preparation operations the top-N transactions for the online software product or application may be defined or determined. Then, in order to mimic real-world production behavior, a transaction mix (or occurrence percentages) for these transactions may be selected or defined. Moreover, relevant seed data and a customized load test script for the performance measurements may be set up. Furthermore, the computer system (such as computer system 300 in FIG. 3) may be prepared with at least one web server, an application server, and a load balancer. This configuration may constitute one "unit" of the computer-system infrastructure. (However, in other embodiments different configurations, which have fewer or more components, may be used.)

During the performance-calibration operations, performance measurements may be performed using the load-test script with different numbers of concurrent users of the software product. In some embodiments, the performance measurements may be performed for a step-wise series of concurrent users, for example, starting the load test script with ten users, then twenty users, etc., up to a target maximum number of concurrent users per hour (such as a maximum of 200 concurrent users). Next, using the performance load-test measurements, the weights for the measured average response times and throughputs may be determined.

Figure 2:
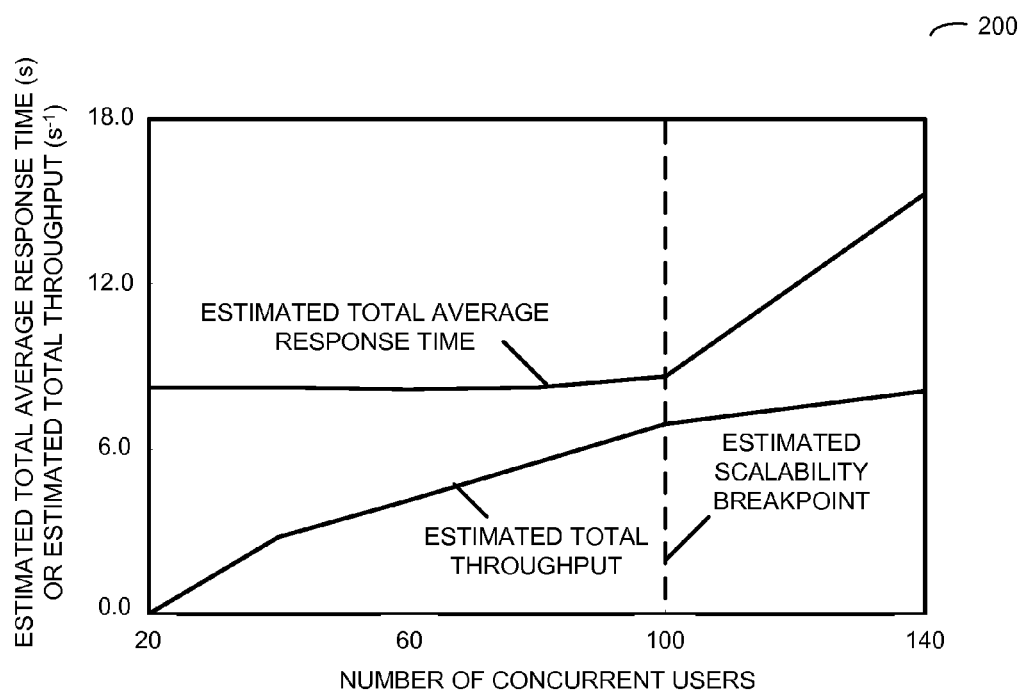
FIG. 2 is a graph of the estimated total average response time and the estimated total throughput as a function of the number of simulated concurrent users of the software product in accordance with an embodiment of the present disclosure.

Furthermore, during the scalability-breakpoint operations the weights may be used in a weighted sum to calculate the total average response time and the total throughput. Then, as shown in FIG. 2, the scalability breakpoint may be determined from the intercept (or minimum spacing) between the estimated total average response time and the estimated total throughput. In some embodiments, the standard deviations of estimated average response times and throughputs relative to the measurements may be computed to assess the accuracy and analysis risks during verification.

In some embodiments of method 100, there may be additional or fewer operations. Moreover, the order of the operations may be changed, and/or two or more operations may be combined into a single operation. For example, instead of using simulated concurrent users during the performance load tests (operation 110), different numbers of actual users may be used.

In an exemplary embodiment, the scalability breakpoint for an online implementation of financial software is estimated based on performance metrics that are measured during performance load tests over an hour interval for a set of 31 transactions for concurrent users numbering between 20 and 140 in 20-user increments. Table 1 provides an example of a set of 31 transactions and associated occurrence percentages (i.e., the transaction mix) during performance load tests for different numbers of simulated concurrent users of the financial software.

TABLE 1

| Transaction | Occurrence Percentage (%) |
| --- | --- |
| Launch Financial Software | 0.7 |
| Login | 0.7 |
| Profit and Loss Report | 3.2 |
| Reports Overview | 3.2 |
| Split Run Report | 3.2 |
| Reports Overview | 3.0 |
| General Ledger | 3.0 |
| Reports Overview | 3.0 |
| Run by Account Report | 3.0 |
| Go to Register | 2.9 |
| Edit Register | 2.9 |
| Enter Bills Page | 3.6 |
| Create Bill | 3.6 |
| Update Bill | 3.6 |
| Create Invoice Page | 3.6 |
| Save Invoice | 3.6 |
| Update Invoice | 3.6 |
| Sales Receipt Page | 3.5 |
| Create Receipt | 3.5 |
| Update Receipt | 3.5 |
| Deposit Page | 3.4 |
| Make Deposit | 3.4 |
| Pay Bills Page | 3.3 |
| Pay Bills | 3.3 |
| Receive Payments Page | 3.2 |
| Save Payment | 3.2 |
| Reconcile Page | 3.2 |
| Reconcile | 3.2 |
| Write Checks Page | 3.2 |
| Save Check | 3.2 |
| Create Company File | 6.3 |

Table 2 provides an example of the measured average response time, the measured throughput per second and the determined weight for each of the transactions in the set of transactions for 20 simulated concurrent users. In particular, the weights are those in weighted averages of the measured average response times and throughputs that provide the best estimates of the total average response time and the total throughput (8.252 and 0.026, respectively). These measurements and the associated analysis (to determine the weights) are then repeated for other simulated numbers of concurrent users (such as 40, 60, 80, etc.).

TABLE 2

| Transaction | Average Response Time | Standard Deviation | Throughput | Weight |
| --- | --- | --- | --- | --- |
| Launch Financial Software | 5.508 | 1.36 | 0.300 | 0.01 |
| Login | 25.766 | 7.444 | 0.005 | 0.01 |
| Profit and Loss Report | 2.828 | 1.79 | 0.022 | 0.03 |

TABLE 2-continued

| Transaction | Average Response Time | Standard Deviation | Throughput | Weight |
|---|---|---|---|---|
| Reports Overview | 2.983 | 0.966 | 0.021 | 0.03 |
| Split Run Report | 0.48 | 0.185 | 0.021 | 0.03 |
| Reports Overview | 3.362 | 1.361 | 0.021 | 0.03 |
| General Ledger | 0.581 | 0.487 | 0.021 | 0.03 |
| Reports Overview | 0.307 | 0.433 | 0.020 | 0.03 |
| Run by Account Report | 0.754 | 0.607 | 0.020 | 0.03 |
| Go to Register | 2.313 | 1.329 | 0.020 | 0.03 |
| Edit Register | 1.776 | 0.797 | 0.020 | 0.03 |
| Enter Bills Page | 4.987 | 2.02 | 0.024 | 0.04 |
| Create Bill | 5.162 | 1.678 | 0.024 | 0.04 |
| Update Bill | 3.525 | 1.324 | 0.024 | 0.04 |
| Create Invoice Page | 5.448 | 1.212 | 0.024 | 0.04 |
| Save Invoice | 3.577 | 1.707 | 0.024 | 0.04 |
| Update Invoice | 2.37 | 1.185 | 0.024 | 0.04 |
| Sales Receipt Page | 4.324 | 1.076 | 0.024 | 0.03 |
| Create Receipt | 3.242 | 0.916 | 0.024 | 0.03 |
| Update Receipt | 2.237 | 0.455 | 0.024 | 0.03 |
| Deposit Page | 4.852 | 0.89 | 0.023 | 0.03 |
| Make Deposit | 5.183 | 1.12 | 0.023 | 0.03 |
| Pay Bills Page | 4.154 | 1.206 | 0.023 | 0.03 |
| Pay Bills | 1.251 | 1.005 | 0.023 | 0.03 |
| Receive Payments Page | 5.589 | 2.738 | 0.022 | 0.03 |
| Reconcile Page | 4.579 | 2.29 | 0.022 | 0.03 |
| Reconcile | 7.348 | 1.16 | 0.022 | 0.03 |
| Write Checks Page | 4.641 | 1.252 | 0.022 | 0.03 |
| Save Check | 5.294 | 1.257 | 0.022 | 0.03 |
| Create Company File | 75.13 | 2.816 | 0.043 | 0.06 |

The estimated scalability breakpoint may be determined from the estimated total average response time and the estimated total throughput as a function of the number of simulated concurrent users. This is shown graphically in FIG. 2, which presents a graph 200 of the estimated total average response time and the estimated total throughput as a function of the number of simulated concurrent users. In particular, for a given computer-system implementation of the online software product, the scalability breakpoint (i.e., the maximum utilization of the system), is the x-axis value at the intersection or closest spacing of the estimated total throughput and the estimated total average response curves.

In this example, the estimated scalability breakpoint is 100 concurrent users. Larger numbers of concurrent users may be serviced by adding additional 'units' to the computer system.

Figure 3:
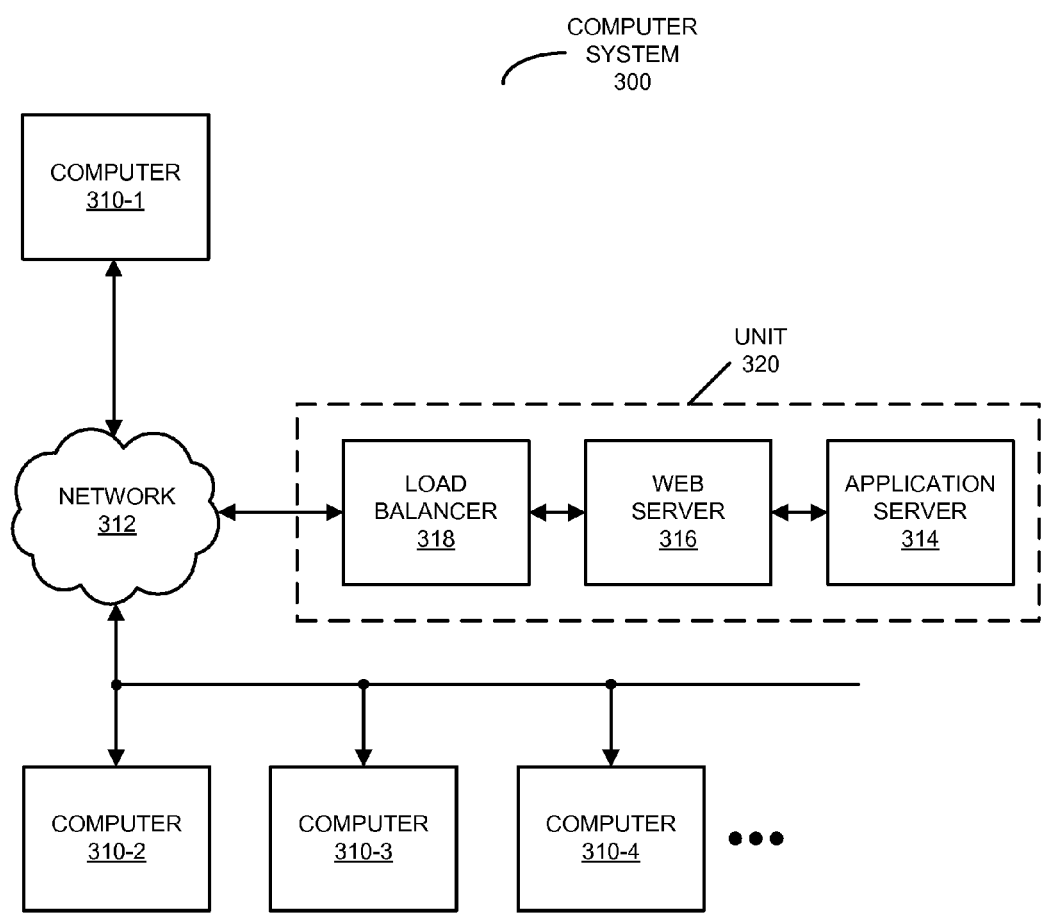
FIG. 3 is a block diagram illustrating a computer system with a client-server implementation of the software product in accordance with an embodiment of the present disclosure.

Note that the software product may be implemented using a client-server architecture. This is shown in FIG. 3, which presents a block diagram illustrating a computer system 300 with a client-server implementation of the software product. During operation, users of computers 310, such as a user of computer 310-1, may use a software product, such as financial software or a financial software application. For example, the user may interact with a web page that is provided by application server 314 to web server 316, and then to computer 310-1 via load balancer 318 and network 312. This web page may be rendered by a web browser on computer 310-1. In some embodiments, at least a portion of the financial software is resident on and executes on computer 310-1. For example, the user may use a stand-alone financial software application or a portion of another application that is resident on and which executes on computer 310-1 (such as financial software that is provided by application server 314 or that is installed and which executes on computer 310-1).

In some embodiments, at least a portion of the financial software application may be an application tool (such as a financial software application tool) that is embedded in the web page (and which executes in a virtual environment of the web browser). Thus, the financial software application tool may be provided to the user via the client-server architecture.

In principle, multiple users at computers 310 may concurrently use the software product. Because application server 314, web server 316 and load balancer 318 in unit 320 have a finite utilization capacity when executing the software product, there are limits on the number of concurrent users. The optimal or maximum capacity utilization can be estimated using the scalability breakpoint determined using the estimation technique. This may allow providers of the software product to develop and maintain one or more instances of unit 320 to help ensure a high-quality user experience and service.

Figure 4:
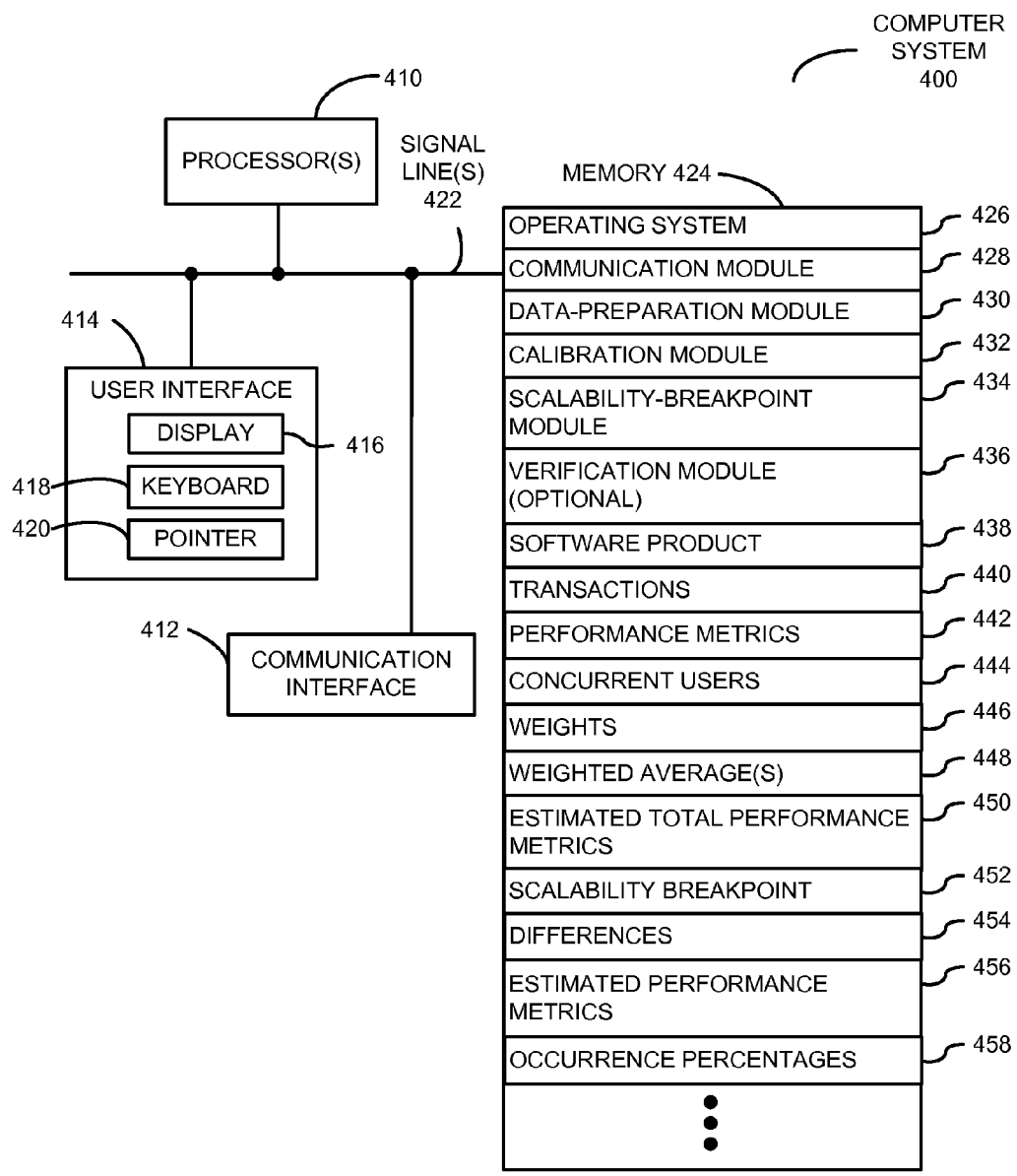
FIG. 4 is a block diagram illustrating a computer system that performs the method of FIG. 1 in accordance with an embodiment of the present disclosure.

We now further describe embodiments of the computer system and its use. FIG. 4 presents a block diagram illustrating a computer system 400 that performs method 100 (FIG. 1). Computer system 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: data-preparation module 430 (or a set of instructions), calibration module 432 (or a set of instructions), scalability-breakpoint module 434 (or a set of instructions), optional verification module 436 (or a set of instructions) and/or software product 438 (or a set of instructions). Note that one or more of these program modules (or sets of instructions) may constitute a computer-program mechanism.

During method 100 (FIG. 1), data-preparation module 430 may define top-N transactions 440 (and, more generally, one or more sets of transactions) and associated occurrence percentages 458 for software product 438. Then, calibration module 432 may measure performance metrics 442 (such as average response times and average throughputs) while transactions 440 are executed by processor(s) 410 with different numbers of simulated concurrent users 444.

Furthermore, calibration module 432 may determine weights 446 in one or more weighted average(s) 448 that are used to estimate total performance metrics 450 (such as the estimated total average response time and the estimated total throughput) for transactions 440 based on measured performance metrics 442. For example, weights 446 may be determined using regression analysis based on measured performance metrics 442 for transactions 440 for different numbers of simulated concurrent users 444.

Next, scalability-breakpoint module 434 determines estimated scalability breakpoint 452 using estimated total performance metrics 450 as a function of the number of simulated concurrent users 444.

In some embodiments, optional verification module 436 may verify estimated total performance metrics 450 based on differences 454 (such as a standard deviation) between measured performance metrics 442 for transactions 440 at a given number of simulated concurrent users 444 and corresponding estimated performance metrics 456.

Note that in some embodiments one or more of the modules in memory 424 may be included in software product 438.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of computer system 400 may be distributed over a large number of servers or computers, with various groups of the servers or computers performing particular subsets of the functions. In some embodiments, some or all of the functionality of computer system 400 may be implemented in one or more application-specific integrated circuits (ASICs) and/or one or more digital signal processors (DSPs).

Computers and servers in computer systems 400 (FIG. 4) and/or 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, LAN, WAN, MAN, or a combination of networks, or other technology enabling communication between computing systems.

In exemplary embodiments, software product 438 includes financial software, such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Figure 5:
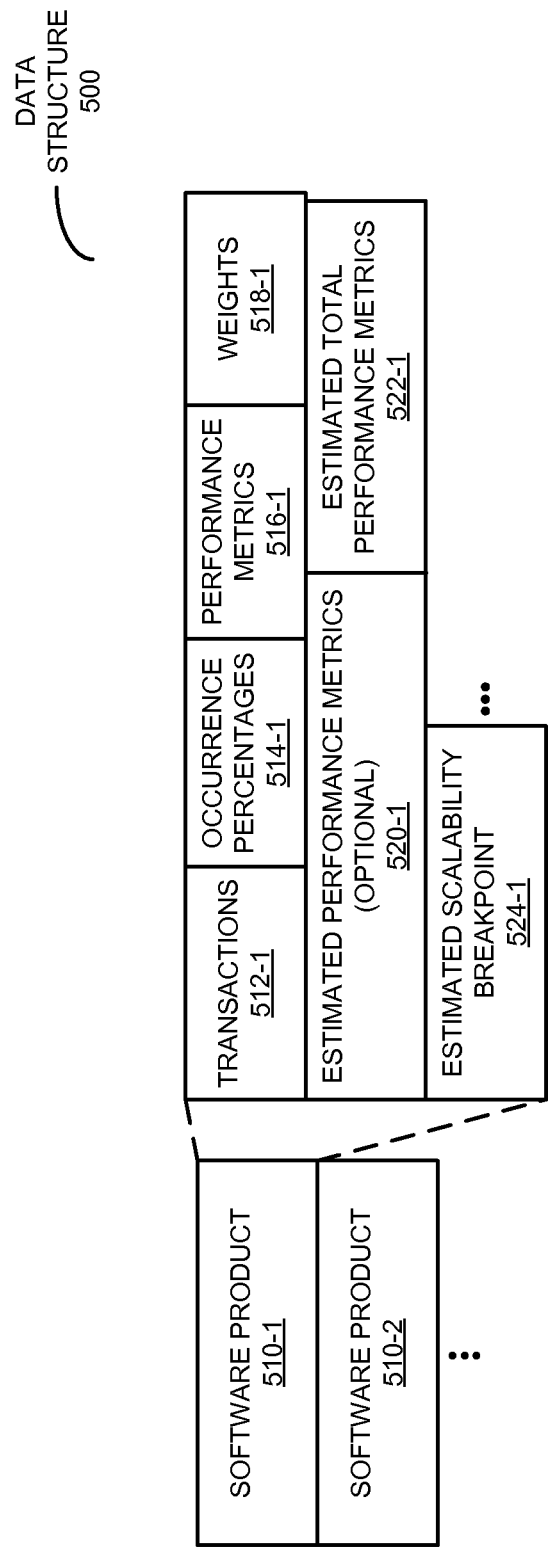
FIG. 5 is a block diagram illustrating a data structure for use in the computer system of FIG. 4 in accordance with an embodiment of the present disclosure.

We now discuss a data structure that may be used in computer system 400. FIG. 5 is a block diagram illustrating a data structure 500. This data structure may include scalability-breakpoint information associated with software products 510. In particular, the scalability-breakpoint information for software product 510-1 may include: one or more sets of transactions 512-1, occurrence percentages 514-1, measured performance metrics 516-1, weights 518-1, optional estimated performance metrics 520-1, estimated total performance metrics 522-1, and/or an estimated scalability breakpoint 524-1.

Computer system 300 (FIG. 3), computer system 400 (FIG. 4) and/or data structure 500 may include fewer components or additional components. Moreover, two or more components may be combined into a single component, and/or a position of one or more components may be changed. In some embodiments, the functionality of computer systems 300 (FIG. 3) and/or 400 may be implemented more in hardware and less in software, or less in hardware and more in software, as is known in the art.

While the preceding discussion illustrated the use of the estimation technique by a provider of the software product (such as the financial software), in other embodiments the estimation technique may be provided by a third party as a service to one or more other entities or companies, such as developers or providers of software programs or applications. For example, the third party may be a host provider for online software products that are developed by the other entities or companies.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for estimating a scalability breakpoint of a software product, comprising:

executing performance load tests for different numbers of simulated concurrent users of the software product, wherein a performance load test for a given number of simulated concurrent users includes an associated set of transactions that are executed by the software product, and wherein a given transaction has an associated occurrence percentage during the performance load test;

during the performance load tests, measuring performance metrics for the transactions in the associated sets of transactions;

determining estimated total performance metrics for the transactions in the associated sets of transactions for the different numbers of simulated concurrent users based on the measured performance metrics and the associated sets of transactions; and calculating, using a computer, the estimated scalability breakpoint from the determined estimated total performance metrics, wherein calculating the estimated scalability breakpoint comprises calculating an optimal number of concurrent users for the software product, wherein the estimated total performance metrics include an estimated total average response time and an estimated total throughput for the different numbers of simulated concurrent users, wherein the optimal number of concurrent users for the software product comprises a number of simulated concurrent users at a minimum spacing between the estimated total average response time as a function of a number of simulated concurrent users and the estimated total throughput as a function of a number of simulated concurrent users.

2. The method of claim 1, wherein the performance metrics include an average response time and a throughput for each of the transactions in the associated sets of transactions for the different numbers of simulated concurrent users.

3. The method of claim 2, wherein the optimal number of concurrent users for the software product is equal to a number of simulated concurrent users at a minimum distance between the estimated total average response time as a function of a count of simulated concurrent users and the estimated total throughput as a function of the count of simulated concurrent users.

4. The method of claim 2, wherein the optimal number of concurrent users for the software product is equal to a number of simulated concurrent users at an intersection of the estimated total average response time as a function of a count of simulated concurrent users and the estimated total throughput as a function of the count of simulated concurrent users.

5. The method of claim 1, wherein the minimum spacing comprises an intersection of the estimated total average response time as a function of a number of simulated concurrent users and the estimated total throughput as a function of a number of simulated concurrent users.

6. The method of claim 1, wherein determining the estimated total performance metrics involves determining weights for the measured performance metrics for the transactions in the associated sets of transactions for the different numbers of simulated concurrent users.

7. The method of claim 6, wherein, for the given number of simulated concurrent users, determining the weights involves a regression analysis using the measured performance metrics and the associated set of transactions for the given number of simulated concurrent users.

8. The method of claim 7, wherein the method further comprises verifying the estimated scalability breakpoint based on differences between the measured performance metrics for the associated set of transactions for the given number of simulated concurrent users and corresponding estimated performance metrics.

9. The method of claim 6, wherein, for the given number of simulated concurrent users, determining the estimated total performance metrics involves calculating a weighted average of the measured performance metrics using the determined weights.

10. The method of claim 1, wherein the software product includes a software application and an associated client-server hardware implementation.

11. The method of claim 10, wherein the client-server hardware implementation includes at least a web server, a load balancer and an application server.

12. An computer-program product for use in conjunction with a computer system, the computer-program product comprising an non-transitory computer-readable storage medium and a computer-program mechanism embedded therein, to estimate a scalability breakpoint of a software product, the computer-program mechanism including:

instructions for executing performance load tests for different numbers of stimulated concurrent users of the software product, wherein a performance load test for a given number of simulated concurrent users includes an associated set of transactions that are executed by the software product, and wherein a given transaction has an associated occurrence percentage during the performance load test;

instructions for measuring, during the performance load tests, performance metrics for the transactions in the associated sets of transactions;

instructions for determining estimated total performance metrics for the transactions in the associated sets of transactions for the different numbers of simulated concurrent users based on the measured performance metrics and the associated sets of transactions; and instructions for calculating the estimated scalability breakpoint from the determined estimated total performance metrics, wherein calculating the estimated scalability breakpoint comprises calculating an optimal number of concurrent users for the software product, wherein the estimated total performance metrics include an estimated total average response time and an estimated total throughput for the different numbers of simulated concurrent users;

wherein the optimal number of concurrent users for the software product comprises a number of simulated concurrent users at minimum spacing between the estimated total average response time as a function of a number of simulated concurrent users and the estimated total throughput as a function of a number of simulated concurrent users.

13. The computer-program product of claim 12, wherein the performance metrics include an average response time and a throughput for each of the transactions in the associated sets of transactions for the different numbers of simulated concurrent users.

14. The computer-program product of claim 12, wherein the scalability criterion includes an intersection of the estimated total average response time as function of a number of simulated concurrent users and the estimated total throughput as a function of a number of simulated concurrent users.

15. The computer-program product of claim 12, wherein determining the estimated total performance metrics involves determining weights for the measured performance metrics for the transactions in the associated sets of transactions for the different numbers of simulated concurrent users.

16. The computer-program product of claim 15, wherein, for the given number of simulated concurrent users, determining the weights involves a regression analysis using the measured performance metrics and the associated set of transactions for the given number of simulated concurrent users.

17. The computer-program product of claim 16, wherein the computer-program mechanism further includes instructions for verifying the estimated scalability breakpoint based on differences between the measured performance metrics for the associated set of transactions for the given number of simulated concurrent users and corresponding estimated performance metrics.

18. The computer-program product of claim 15, wherein, for the given number of simulated concurrent users, determining the estimated total performance metrics involves calculating a weighted average of the measured performance metrics using the determined weights.

19. The computer-program product of claim 12, wherein the software product includes a software application and an associated client-server hardware implementation.

20. The computer-program product of claim 19, wherein the client-server hardware implementation includes at least a web server, a load balancer and an application server.

21. A computer system, comprising:
   a processor;
   memory; and
   a program module, wherein the program module is stored in the memory and configurable to be executed by the processor to estimate a scalability breakpoint of a software product, the program module including:
      instructions for executing performance load tests for different numbers of simulated concurrent users of the software product, wherein a performance load test for a given number of simulated concurrent users includes an associated set of transactions that are executed by the software product, and wherein a given transaction has an associated occurrence percentage during the performance load test;
      instructions for measuring, during the performance load tests, performance metrics for the transactions in the associated sets of transactions;
      instructions for determining estimated total performance metrics for the transactions in the associated sets of transactions for the different numbers of simulated concurrent users based on the measured performance metrics and the associated sets of transactions; and
      instructions for calculating the estimated scalability breakpoint from the determined estimated total performance metrics, wherein calculating the estimated scalability breakpoint comprises calculating an optimal number of concurrent users for the software product,
   wherein the estimated total performance metrics include an estimated total average response time and an estimated total throughput for the different numbers of simulated concurrent users,
   wherein the optimal number of concurrent users for the software product comprises a number of simulated concurrent users at a minimum spacing between the estimated total average response time as a function of a number of simulated concurrent users and the estimated total throughput as a function of a number of simulated concurrent users.

* * * * *